(12) United States Patent
Wu et al.

(10) Patent No.: US 9,294,891 B2
(45) Date of Patent: Mar. 22, 2016

(54) SHORT MESSAGE SENDING METHOD, SHORT MESSAGE SERVICE CENTER AND GATEWAY

(75) Inventors: Hao Wu, Shenzhen (CN); Fang Xie, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/233,858

(22) PCT Filed: May 23, 2012

(86) PCT No.: PCT/CN2012/075944
§ 371 (c)(1),
(2), (4) Date: Jan. 20, 2014

(87) PCT Pub. No.: WO2013/152547
PCT Pub. Date: Oct. 17, 2013

(65) Prior Publication Data
US 2015/0304825 A1 Oct. 22, 2015

(30) Foreign Application Priority Data
Apr. 12, 2012 (CN) .......................... 2012 1 0106120

(51) Int. Cl.
*H04W 4/00* (2009.01)
*H04W 4/14* (2009.01)
(Continued)

(52) U.S. Cl.
CPC .................. *H04W 4/14* (2013.01); *H04L 45/74* (2013.01); *H04L 51/06* (2013.01);
(Continued)

(58) Field of Classification Search
CPC ............................... H04W 4/14; H04W 88/184

USPC .......... 455/433, 466, 558, 456.3, 414.1, 445; 370/331, 335
See application file for complete search history.

(56) References Cited

U.S. PATENT DOCUMENTS

| 5,920,822 | A | * | 7/1999 | Houde et al. | .................. | 455/466 |
| 2009/0221310 | A1 | * | 9/2009 | Chen et al. | ..................... | 455/466 |

(Continued)

FOREIGN PATENT DOCUMENTS

| CN | 1567896 A | 1/2005 |
| CN | 1949892 A | 4/2007 |

(Continued)

OTHER PUBLICATIONS

International Search Report of PCT/CN2012/075944, dated Jan. 24, 2013.

*Primary Examiner* — Kiet Doan
(74) *Attorney, Agent, or Firm* — Banner & Witcoff, Ltd.

(57) ABSTRACT

A short message sending method, a short message service center (SMS-SC) and a gateway are provided. The short message service center constructs a message body for bearing short message, includes routing information of the short message in this message body, and sends the message body to a short message mobile switching center gateway; after receiving the message body and determining that the message body includes the routing information of the short message, the short message mobile switching center gateway sends the short message to a core network service node according to the routing information. The SMS-SC sends the obtained routing information together with the short message to an SMS-GMSC, so that the SMS-GMSC does not need to request the routing information from an HSS or an HLR, which can reduce the interactive signaling, save the network resources, and optimize the system performance.

6 Claims, 1 Drawing Sheet

(51) Int. Cl.
*H04L 12/741* (2013.01)
*H04L 12/58* (2006.01)
*H04M 1/725* (2006.01)
*H04W 40/02* (2009.01)
*H04W 88/02* (2009.01)
*H04W 88/16* (2009.01)
*H04W 88/18* (2009.01)

(52) U.S. Cl.
CPC ......... *H04M 1/72552* (2013.01); *H04W 40/02* (2013.01); *H04W 88/02* (2013.01); *H04W 88/16* (2013.01); *H04W 88/184* (2013.01)

(56) References Cited

U.S. PATENT DOCUMENTS

2011/0287764 A1 11/2011 Zitnik
2012/0135761 A1* 5/2012 Nenner et al. ............... 455/466

FOREIGN PATENT DOCUMENTS

| CN | 101227468 A | 7/2008 |
| CN | 101330759 A | 12/2008 |
| WO | 2004019634 A1 | 3/2004 |
| WO | 2006/031678 A2 | 3/2006 |
| WO | 2011087239 A2 | 7/2011 |

* cited by examiner

SHORT MESSAGE SENDING METHOD, SHORT MESSAGE SERVICE CENTER AND GATEWAY

TECHNICAL FIELD

The present document relates to the terminal communication field, and in particular, to a short message sending method and a short message service center and a gateway.

BACKGROUND OF THE RELATED ART

In the related art, the Evolved Packet System (EPS) network does not provide the circuit switching service, so the network element Mobility Management Entity (MME) of the EPS network cannot support the sending of the common short message. Usually the Evolved Packet System network provides data services, such as downloading and uploading from/to the network, etc., and the circuit switching network provides services, such as voice communication, short message, etc. And the EPS network can provide the data service with a higher peak rate for the user, therefore many users using the data service usually register to the EPS network; however when enjoying the high-speed data service, these users need to receive the short message service, in order to meet this demand, the users registering to the EPS network are also required to register to the circuit switching network which provides the short message service at the same time, thus the process of sending the short message is that: a short message service center (SMS-SC) sends the short message to the Mobile Switching Center Gateway used for sending the short message (SMS-GMSC), and the SMS-GMSC inquires the service node information of the terminal, that is, the address of the Mobile Switching Center and the address of the mobility management unit, from a home subscriber information storage network element (HSS), sends the address to the Mobile Switching Center (MSC) after obtaining the address, and then the Mobile Switching Center sends it to the mobility management unit (MME), and finally the MME sends the short message to the terminal.

As shown in FIG. 1, after the users in the packet switching network also register to circuit switching network that can provide the short message service at the same time, the process of sending the short message includes that: the short message service center (SMS-SC) sends the short message to the Mobile Switching Center Gateway used for sending the short message (SMS-GMSC), and the SMS-GMSC inquires the routing information required for sending the short message, that is, the service node information of the terminal, that is, the address of the Mobile Switching Center (MSC) or the address of the Service GPRS Supporting Node (SGSN), from a home subscriber information storage network element (HSS/HLR), and sends the short message to the MSC or SGSN after obtaining the address, and then the MSC or the SGSN sends the short message to the terminal.

The network elements are introduced as follows:

the SMS-SC: configured to generate the short message contents to encapsulate into the short message data packet according to the short message protocol;

the SMS-GMSC: configured to receive the short message data packet sent by the SMS-SC; read the parameters in the short message data packet, and check the parameters; and inquiry the routing information of the terminal from the HSS (here the routing information refers to the identification or address of the MSC or SGSN by which the short message is sent);

the HSS/HLR: configured to store subscription information of every subscriber, and the service node information (for example, the identification or address of the service node providing service for the terminal (MSC or SGSN));

the MSC: a core network entity providing service for the terminal in the circuit switching network (the service includes sending the control signaling, the short message delivery, and the mobility management);

SGSN: a core network entity providing service for the terminal in the packet switching network (the service includes sending the control signaling, the short message delivery, and the mobility management).

The device trigger service is a kind of services that the server triggers the terminal to establish the connection with the server or report the service voluntarily. The realization way of the device trigger service is to send a non-access stratum (NAS) signaling or short message. In the device trigger service, an application server sends a trigger request to an Interworking functional unit (IWF), and the trigger request includes an identification of the terminal to be triggered; the IWF sends the identification of the terminal to the HSS or the HLR, to obtain information of a core network service node of the terminal (that is, the MSC or the SGSN) from the HSS or the HLR (the information includes the identification or the address of the service node, and the ability about whether the corresponding service node supports the NAS signaling to send the trigger message). The IWF determines which transmission mode is adopted according to the ability of the service node. When the service node does not support the transmission mode of NAS signaling, the IWF sends the trigger request received from the application server to the SMS-SC, that is, sends the trigger request to the terminal with the short message, and the identification of the service node here is the routing information required for sending the short message.

SUMMARY OF THE INVENTION

The technical problem that the embodiment of the present document requires to solve is to provide a short message sending method and a short message service center and a gateway, to solve the problem of optimizing the resource utilization rate.

In order to solve the above-mentioned technical problem, the embodiment of the present document provides a short message sending method, wherein, a short message service center constructs a message body for bearing short message, contains routing information of the short message in this message body, and sends the message body to a short message mobile switching center gateway; and after receiving the message body and determining that the message body contains the routing information of the short message, the short message mobile switching center gateway sends the short message to a core network service node according to the routing information.

The above-mentioned method further can have the following characteristic:

after receiving the message body and determining that the message body does not contain the routing information of the short message and inquiring the routing information of the short message from a home subscriber information storage network element, the short message mobile switching center gateway sends the short message to the core network service node according to this routing information.

The above-mentioned method further can have the following characteristic:

the way of the short message service center learning the routing information of the short message is: when an interworking functional unit (IWF) learns that the core network service node does not support an interface with the IWF, sending the routing information of the short message to the short message service center.

The above-mentioned method further can have the following characteristic:

the message body contains an information element used for bearing the routing information.

The above-mentioned method further can have the following characteristics:

the routing information of the short message refers to an identification or an address of the core network service node.

The above-mentioned method further can have the following characteristics:

the core network service node refers to a mobile switching center or a general packet radio service (GPRS) supporting node.

In order to solve the above-mentioned technical problem, the embodiment of the present document further provides a short message service center, comprising a short message constructing module and a sending module, wherein, the short message constructing module is configured to construct a message body for bearing short message and add routing information of the short message, that is, location information of a core network service node by which the short message is required to pass, in this message body; and the sending module is configured to send the message body to a short message mobile switching center gateway.

The above-mentioned short message center further can have the following characteristics:

the routing information of the short message refers to an identification or an address of the core network service node.

In order to solve the above-mentioned technical problem, the embodiment of the present document further provides a short message mobile switching center gateway, comprising an information analyzing module and a sending module, wherein, the information analyzing module is configured to analyze a message body received from a short message service center, judge whether the message body contains routing information of the short message, and notify the sending module; and the sending module is configured to send the short message to the core network service node according to this routing information when the message body contains the routing information of the short message.

The above-mentioned short message mobile switching center gateway further can have the following characteristics:

the sending module is further configured to, when determining that the message body does not contain the routing information of the short message, after inquiring the routing information of the short message from a home subscriber information storage network element, send the short message to the core network service node according to that routing information.

Compared with the device trigger service procedures in the related art, in the present scheme, the SMS-SC sends the obtained routing information (obtained from the IWF) together with the short message to the SMS-GMSC, thereby the SMS-GMSC does not need to request the routing information from the HSS or the HLR, which can reduce the interactive signaling, save the network resources and optimize the system performance.

PREFERRED EMBODIMENTS OF THE INVENTION

Figure 1:
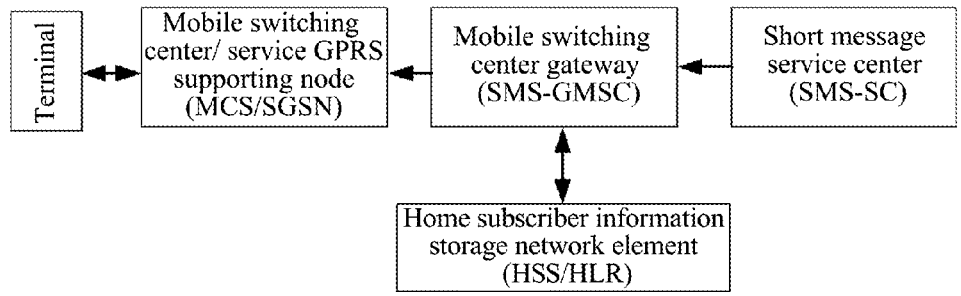
FIG. 1 is a structure diagram of a short message sending system in the related art.
Figure 2:
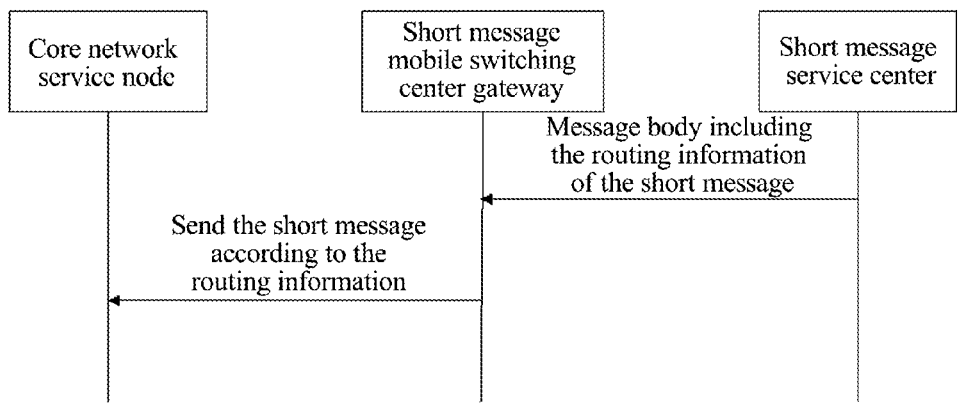
FIG. 2 is a diagram of a short message sending method in an embodiment.

As shown in FIG. 2, the short message sending method includes the following steps: a short message service center (SMS-SC) constructs a message body for bearing short message, includes routing information of the short message in this message body, and sends the message body to a short message mobile switching center gateway (SMS-GMSC); and after receiving the message body and determining that the message body includes the routing information of the short message, the SMS-GMSC sends the short message to a core network service node according to the routing information.

After receiving the message body and determining that the message body does not include the routing information of the short message and inquiring the routing information of the short message from a home subscriber information storage network element, the SMS-GMSC sends the short message to the core network service node according to this routing information.

The way of the SMS-SC learning the routing information of the short message can be learned from an interworking functional unit (IWF), for example, when the IWF learns that the core network service node does not support an interface with the IWF, the routing information of the short message is sent to the short message service center.

The message body includes an information element used for bearing the routing information. For example, the SMS-SC sends "message transmission" message to the SMS-GMSC, and the structure of the message body is shown in Table 1.

TABLE 1

| Information element | Name | Description |
| --- | --- | --- |
| Relay layer original address (RP-OA) | Original address | Address of the SMS-SC |
| Relay layer destination address (RP-DA) | Destination address | Address of the terminal |
| Relay layer user data (RP-UD) | User data | Short message sent to the terminal |
| Relay layer routing information (RP-RI) | routing information | Routing information of the sent short message |
| ... | ... | ... |

The message data organization is not limited to the above-mentioned information elements, and there can also be other parameters required by the short message mechanism, which would not be enumerated one by one here.

Wherein, the information element of the relay layer routing information is a newly added information element, used for carrying the routing information of the short message. The SMS-GMSC checks whether this message body includes the routing information after receiving the above-mentioned message body; if the routing information is included, then the short message is sent to the core network service node according to the routing information; if the routing information is not included, then inquiring the routing information from the HLR or the HSS, and sending the short message to the core network service node according to the routing information obtained from the HLR or the HSS.

The routing information of the short message refers to an identification or an address of the core network service node.

The core network service node refers to a mobile switching center or a GPRS service supporting node.

Figure 3:
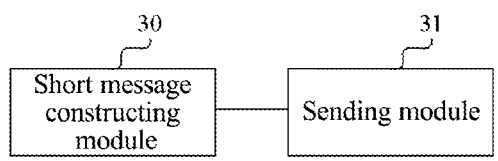
FIG. 3 is a structure diagram of a short message service center in an embodiment.

The corresponding short message service center, as shown in FIG. 3, includes a short message constructing module 30 and a sending module 31.

The short message constructing module 30 is configured to construct a message body for bearing short message and add routing information of the short message, that is, location information of a core network service node by which the short message is required to pass, in this message body; and the sending module 31 is configured to send the message body to a short message mobile switching center gateway.

Figure 4:
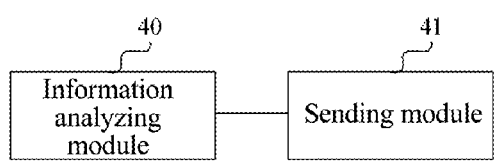
FIG. 4 is a structure diagram of a short message mobile switching center gateway in an embodiment.

The corresponding short message mobile switching center gateway includes an information analyzing module 40 and a sending module 41, as shown in FIG. 4.

The information analyzing module 40 is configured to analyze a message body received from a short message service center, judge whether the message body includes routing information of the short message, and notify the sending module; and the sending module 41 is configured to send the short message to the core network service node according to this routing information when the message body includes the routing information of the short message.

The sending module 41 is further configured to send the short message to the core network service node according to the routing information after inquiring the routing information of the short message from a home subscriber information storage network element when determining that the message body does not include the routing information of the short message.

Specific Embodiment, in step 1, a service server sends trigger message to the IWF, and the trigger message includes an external identification of the terminal;

in step 2, the IWF reads the external identification of the terminal in the trigger message, includes it in a signing information request signaling to send to the HSS or the HLR;

in step 3, the HSS or the HLR inquires the local database according to the external identification sent by the IWF after receiving the signing information request, and obtains the service node information of the terminal, including the identification or the address of the service node, and whether the service node supports a T5 interface;

the T5 interface refers to an interface from the IWF to the service node; and the service node is referred to: an SGSN or an MSC;

the HSS or the HLR includes the identification or the address of the service node and whether the service node supports the T5 interface into a signing information response signaling to send to the IWF;

in step 4, after the IWF obtains the information of the service node, if the service node does not support the T5 interface, then the trigger message and the identification or the address of the service node are sent to the SMS-SC;

in step 5, SMS-SC constructs the trigger message as the data organization of the short message, as shown in Table 2;

TABLE 2

| Information element | Name | Description |
| --- | --- | --- |
| Transmission layer service center time stamp (TP-SCTS) | SMS-SC time | Time of SMS-SC receiving the short message content |

TABLE 2-continued

| Information element | Name | Description |
| --- | --- | --- |
| Transmission layer user data (TP-UD) | User data | Short message content, for example, it is the trigger message in the present embodiment |
| ... | ... | ... |

The short message data organization is not limited to the above-mentioned information elements, and there can also be other parameters required by the short message mechanism, which would not be enumerated one by one here. The short message sent to the terminal is included in the field "TP-UD".

In step 6, the SMS-SC bears the short message in "message transmission" message and sends to the SMS-GMSC, and the message structure of the corresponding message body is shown in Table 1.

The identification or address of the service node received by the SMS-SC from the IWF is set as the content of the RP-RI information element, that is, regarded as the routing information of sending the short message to the terminal.

In step 7, the SMS-GMSC checks whether the field "RP-RI" in the message is empty after receiving the above-mentioned message; if not empty, then Forward Short Message is sent to the core network service node (MSC or SGSN) according to the routing information included in the "RP-RI".

If the field "RP-RI" is empty, then it represents that the message received by the SMS-GMSC from the SMS-SC does not include the routing information. The SMS-GMSC sends "sending short message routing information (SendRoutingInfoForShortMsg)" message to inquire the routing information from the HLR or the HSS, and the "SendRoutingInfoForShortMsg" includes the identification of the terminal. The HLR or the HSS inquires the local database according to the identification of the terminal in the message after receiving the message, and feeds back the routing information required for sending the short message to the SMS-GMSC. The SMS-GMSC sends the "Forward Short Message" message to the core network service node (MSC or SGSN) according to the routing information obtained from the HLR or the HSS.

The message structure of the Forward Short Message is shown in Table 3.

TABLE 3

| Information element | Name | Attribute | Description |
| --- | --- | --- | --- |
| Relay layer original address (RP-OA) | Original address | M | Address of the SMS-SC |
| Relay layer destination address (RP-DA) | Destination address | M | Address of the terminal |
| Relay layer user data (RP-UD) | User data | M | Short message sent to the terminal |
| ... | ... | ... | ... |

The message data organization is not limited to the above-mentioned information elements, and there can also be other parameters required by the short message mechanism, which would not be enumerated one by one here. The short message sent to the terminal is included in the field "RP-UD".

In step 8, the MSC or the SGSN sends the short message to the terminal.

It should be illustrated that, in the case of not conflicting, the embodiments in the present application and features in these embodiments can be combined with each other.

Obviously, the present document can further have a variety of other embodiments. Those skilled in the art can make corresponding modifications and variations according to the present document without departing from the spirit and essence of the present document. And all of these modifications or the variations should be embodied in the scope of the appended claims of the present document.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limited to any specific form of the combination of the hardware and software.

INDUSTRIAL APPLICABILITY

Compared with the device trigger service procedures in the related art, in the present scheme, the SMS-SC sends the obtained routing information (obtained from the IWF) together with the short message to the SMS-GMSC, thereby the SMS-GMSC does not need to request the routing information from the HSS or the HLR, which can reduce the interactive signaling, save the network resources and optimize the system performance.

What we claim is:

1. A short message sending method, comprising:
   a short message service center constructing a message body for bearing a short message, containing routing information of the short message in this message body, and sending the message body to a short message mobile switching center gateway; and
   after receiving the message body, determining whether the message body contains the routing information of the short message or not by the short message mobile switching center gateway;
   if yes, the short message mobile switching center gateway sending the short message to a core network service node according to the routing information;
   if no, the short message mobile switching center gateway inquiring the routing information of the short message from a home subscriber information storage network element, and sending the short message to the core network service node according to this routing information.

2. The method according to claim 1, further comprising:
   when an interworking functional unit (IWF) learns that the core network service node does not support an interface with the IWF, sending the routing information of the short message to the short message service center.

3. The method according to claim 1, wherein,
   the message body contains an information element used for bearing the routing information.

4. The method according to claim 1, wherein,
   the routing information of the short message refers to an identification or an address of the core network service node.

5. The method according to claim 4, wherein,
   the core network service node refers to a mobile switching center or a general packet radio service (GPRS) supporting node.

6. A short message mobile switching center gateway, comprising an information analyzing module and a sending module, wherein,
   the information analyzing module is configured to analyze a message body received from a short message service center, judge whether the message body contains routing information of a short message, and notify the sending module; and
   the sending module is configured to send the short message to a core network service node according to that routing information when the message body contains the routing information of the short message;
   wherein the sending module is further configured to, when determining that the message body does not contain the routing information of the short message, after inquiring the routing information of the short message from a home subscriber information storage network element, send the short message to the core network service node according to that routing information.

* * * * *